US012095205B2

(12) United States Patent
Maesoba et al.

(10) Patent No.: US 12,095,205 B2
(45) Date of Patent: Sep. 17, 2024

(54) CONNECTOR INCLUDING CONDUCTORS WITH POSITIONING STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 322 days.

(21) Appl. No.: 17/629,613

(22) PCT Filed: Jul. 22, 2020

(86) PCT No.: PCT/JP2020/028468

§ 371 (c)(1),
(2) Date: Jan. 24, 2022

(87) PCT Pub. No.: WO2021/029199

PCT Pub. Date: Feb. 18, 2021

(65) Prior Publication Data

US 2022/0247133 A1 Aug. 4, 2022

(30) Foreign Application Priority Data

Aug. 9, 2019 (JP) ................................ 2019-147190

(51) Int. Cl.
*H01R 13/6593* (2011.01)
*H01R 9/05* (2006.01)
(Continued)

(52) U.S. Cl.
CPC .......... *H01R 13/6593* (2013.01); *H01R 9/05* (2013.01); *H01R 13/05* (2013.01); *H01R 13/629* (2013.01);
(Continued)

(58) Field of Classification Search
CPC ...... H01R 13/6593; H01R 9/05; H01R 13/05; H01R 13/629; H01R 13/64;
(Continued)

(56) References Cited

U.S. PATENT DOCUMENTS 5,273,459 A * 12/1993 Davis ................ H01R 13/6593 439/607.48
6,783,397 B2 8/2004 Yang Lee
(Continued)

OTHER PUBLICATIONS

International Search Report issued on Sep. 24, 2020 for WO 2021/029199 A1 (4 pages).

*Primary Examiner* — Justin M Kratt
(74) *Attorney, Agent, or Firm* — Venjuris, P.C.

(57) ABSTRACT

A male connector connected to an end of a cable, said male connector comprising a first male outer conductor, and a second male outer conductor assembled to the first male outer conductor. The first male outer conductor and the second male outer conductor in an assembled state cover a male dielectric body in which a male inner conductor connected to the electric wire is housed. One of the first male outer conductor and the second male outer conductor has a male positioning projection which is formed so as to project toward the other one of the first male outer conductor and the second male outer conductor, and the other one of the first male outer conductor and the second male outer conductor
(Continued)

has a male slit which is formed so as to engage with the male positioning projection.

3 Claims, 9 Drawing Sheets

(51) Int. Cl.

| | |
|---|---|
| ***H01R 13/05*** | (2006.01) |
| ***H01R 13/629*** | (2006.01) |
| ***H01R 13/64*** | (2006.01) |
| ***H01R 13/6583*** | (2011.01) |
| *H01R 13/428* | (2006.01) |
| *H01R 13/506* | (2006.01) |
| *H01R 13/6581* | (2011.01) |
| *H01R 13/6591* | (2011.01) |
| *H01R 13/6592* | (2011.01) |

(52) U.S. Cl.
CPC ......... *H01R 13/64* (2013.01); *H01R 13/6583* (2013.01); *H01R 9/0512* (2013.01); *H01R 9/0518* (2013.01); *H01R 13/428* (2013.01); *H01R 13/506* (2013.01); *H01R 13/6581* (2013.01); *H01R 13/6591* (2013.01); *H01R 13/6592* (2013.01)

(58) Field of Classification Search
CPC .............. H01R 13/6583; H01R 9/0512; H01R 9/0518; H01R 13/6591; H01R 13/6592; H01R 13/428; H01R 13/506; H01R 13/6581
See application file for complete search history.

(56) References Cited

U.S. PATENT DOCUMENTS

| | | | | |
|---|---|---|---|---|
| 10,439,331 | B2 | 10/2019 | Maesoba et al. | |
| 2003/0224656 | A1 * | 12/2003 | Yoshida ............. | H01R 13/4361 439/578 |
| 2007/0238353 | A1 * | 10/2007 | Yamaoka ........... | H01R 13/4364 439/595 |
| 2016/0093984 | A1 | 3/2016 | Iwamoto | |
| 2019/0006785 | A1 | 1/2019 | Maesoba et al. | |

* cited by examiner

CONNECTOR INCLUDING CONDUCTORS WITH POSITIONING STRUCTURE

CROSS REFERENCE TO RELATED APPLICATIONS

This application is a national phase of PCT application No. PCT/JP2020/028468, filed on 22 Jul. 2020, which claims priority from Japanese patent application No. 2019-147190, filed on 9 Aug. 2019, all of which are incorporated herein by reference.

TECHNICAL FIELD

The present disclosure relates to a connector.

BACKGROUND

A connector disclosed in Japanese Patent Laid-open Publication No. 2018-006183 (Patent Document 1 below) is, for example, known as a shield connector connected to an end of a cable in which a communication signal is transmitted. This shield connector is a male connector, and includes a male inner conductor and an outer conductor surrounding the male inner conductor via a dielectric body. Further, the male connector can be fitted with a female connector. The female connector includes a female inner conductor and a female outer conductor that surrounds the female inner conductor via a female dielectric body. When the male connector and the female connector are fitted into each other, the outer conductor is fitted into the outside of the female outer conductor, and the outer conductor and the female outer conductor are connected to each other.

PRIOR ART DOCUMENT

Patent Document

Patent Document 1: JP 2018-006183 A

SUMMARY OF THE INVENTION

Problems to be Solved

In the technique according to Japanese Patent Laid-open Publication No. 2018-006183, the outer conductor is configured such that an upper outer conductor and a lower outer conductor can be assembled with each other. For this reason, when it takes time to align the upper outer conductor and the lower outer conductor, the efficiency of the work of assembling the upper outer conductor and the lower outer conductor is reduced, and the efficiency of assembly work of the connector may be reduced as a whole.

In this specification, a technique is disclosed which improves the efficiency of assembly work of the connector.

Means to Solve the Problem

The present disclosure is directed to a connector to be connected to an end part of a cable in which an outer periphery of an electric wire is covered with a shield body, including: a first outer conductor; and a second outer conductor assembled to the first outer conductor, wherein the first outer conductor and the second outer conductor cover a dielectric body, in which an inner conductor connected to the electric wire is housed, in a state where the first outer conductor and the second outer conductor are assembled, and one of the first outer conductor and the second outer conductor has a positioning projection which is formed so as to project toward the other one of the first outer conductor and the second outer conductor, and the other one of the first outer conductor and the second outer conductor has a positioning recess which is formed so as to engage with the positioning projection.

Effect of the Invention

According to the present disclosure, it is possible to improve the efficiency of assembly work of the connector.

DETAILED DESCRIPTION TO EXECUTE THE INVENTION

Description of Embodiments of Present Disclosure

Figure 1:
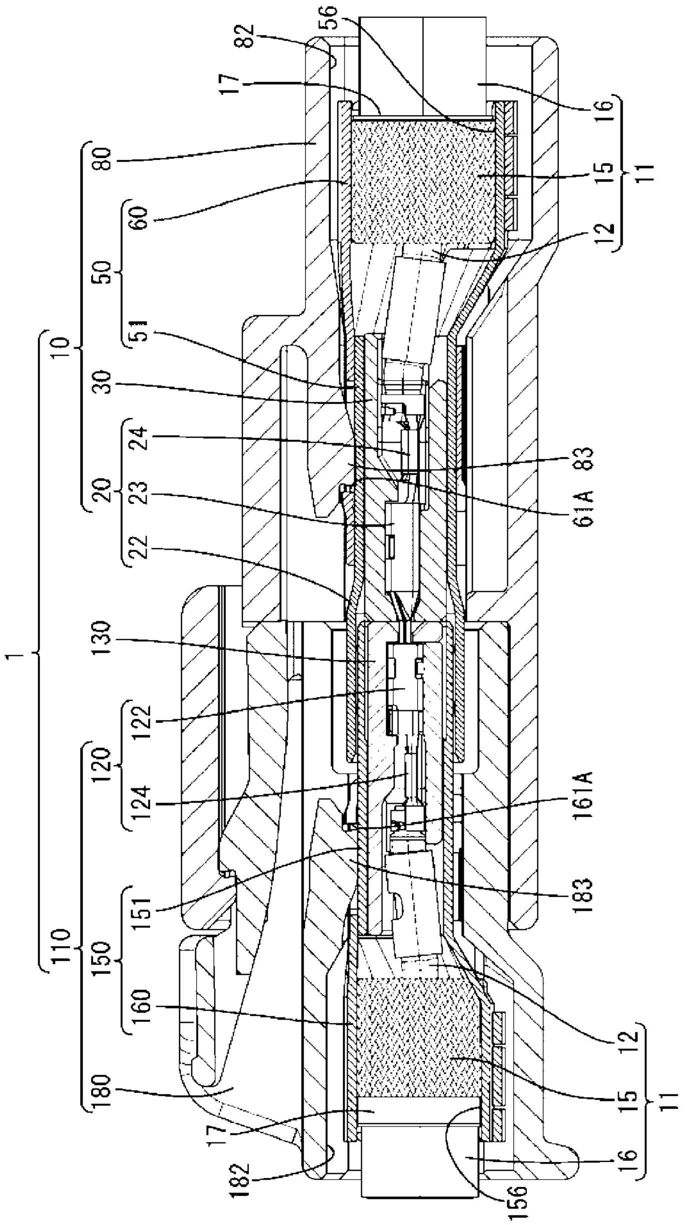
FIG. 1 is a section view showing a connector device according to a first embodiment.

First, embodiments of the present disclosure are listed and described.

(1) The present discloses a connector to be connected to an end part of a cable in which an outer periphery of an electric wire is covered with a shield body, including: a first outer conductor; and a second outer conductor assembled to the first outer conductor, wherein the first outer conductor and the second outer conductor cover a dielectric body, in which an inner conductor connected to the electric wire is housed, in a state where the first outer conductor and the second outer conductor are assembled, and one of the first outer conductor and the second outer conductor has a positioning projection which is formed so as to project toward the other one of the first outer conductor and the second outer conductor, and the other one of the first outer conductor and the second outer conductor has a positioning recess which is formed so as to engage with the positioning projection.

According to the above configuration, the positioning projection and the positioning recess are engaged with each other, and thus the efficiency of assembly work of the first outer conductor and the second outer conductor can be improved. This makes it possible to improve the efficiency of assembly work of the connector.

(2) Preferably, the second outer conductor is assembled to the outside of the first outer conductor, the positioning projection is formed on the first outer conductor so as to project outward, and the positioning recess is formed on the second outer conductor, and the positioning recess is a slit extending in an assembly direction in which the first outer conductor and the second outer conductor are assembled.

According to the above configuration, in the assembly work of the first outer conductor and the second outer conductor, the worker uses the positioning projection formed to project outward as a mark, and can assemble the second outer conductor with the first outer conductor. Thus, the efficiency of assembly work of the first outer conductor and the second outer conductor can be improved, so that the efficiency of assembly work of the connector can be further improved.

(3) Preferably, the second outer conductor includes a crimping piece that is crimped to an outer periphery of the first outer conductor, and a side edge of the crimping piece forms an opening edge of the slit.

According to the above configuration, since the positioning of the crimping piece can be reliably performed, assembly accuracy of the first outer conductor and the second outer conductor can be improved.

(4) Preferably, the first outer conductor and the second outer conductor are housed in the housing in the assembled state, the second outer conductor includes a stabilizer that engages with the housing, and a side edge of the stabilizer forms an opening edge of the slit.

According to the above configuration, since the positioning of the stabilizer can be reliably performed, assembly accuracy of the housing with the first outer conductor and the second outer conductor can be improved.

(5) Preferably, the stabilizer includes a folded portion in which a tip end part of the stabilizer is folded, and the folded portion is inserted into a guide groove formed in the housing.

Since the engagement allowance between the stabilizer and the housing can be increased, assembly accuracy of the housing with the first outer conductor and the second outer conductor can be further improved.

Details of Embodiment of Present Disclosure

A specific example of a connector of the present disclosure is described with reference to the following drawings. Note that the present disclosure is not limited to these illustrations and is intended to be represented by claims and include all changes in the scope of claims and in the meaning and scope of equivalents.

First Embodiment

A first embodiment in the present disclosure will be described with reference to FIGS. 1 to 10. In this embodiment, a connector device 1 for communication is illustrated which is installed, for example, in a vehicle (not shown) such as an automotive vehicle and disposed in a wired communication path between an in-vehicle electrical component (car navigation system, monitor, etc.) in the vehicle and an external device (camera, etc.) or between in-vehicle electrical components.

[Connector Device 1]

As shown in FIG. 1, a connector device 1 includes a female connector 110 (an example of a connector) and a male connector 10 (an example of a connector) that are fitted to each other in a state of being connected to a cable 11. In the following description, a vertical direction will be described with reference to a vertical direction in FIG. 1, and a front side in a front-rear direction will be described as a side where the female connector 110 and the male connector 10 are fitted to each other with reference to the fitting direction thereof.

[Cable 11]

Figure 2:
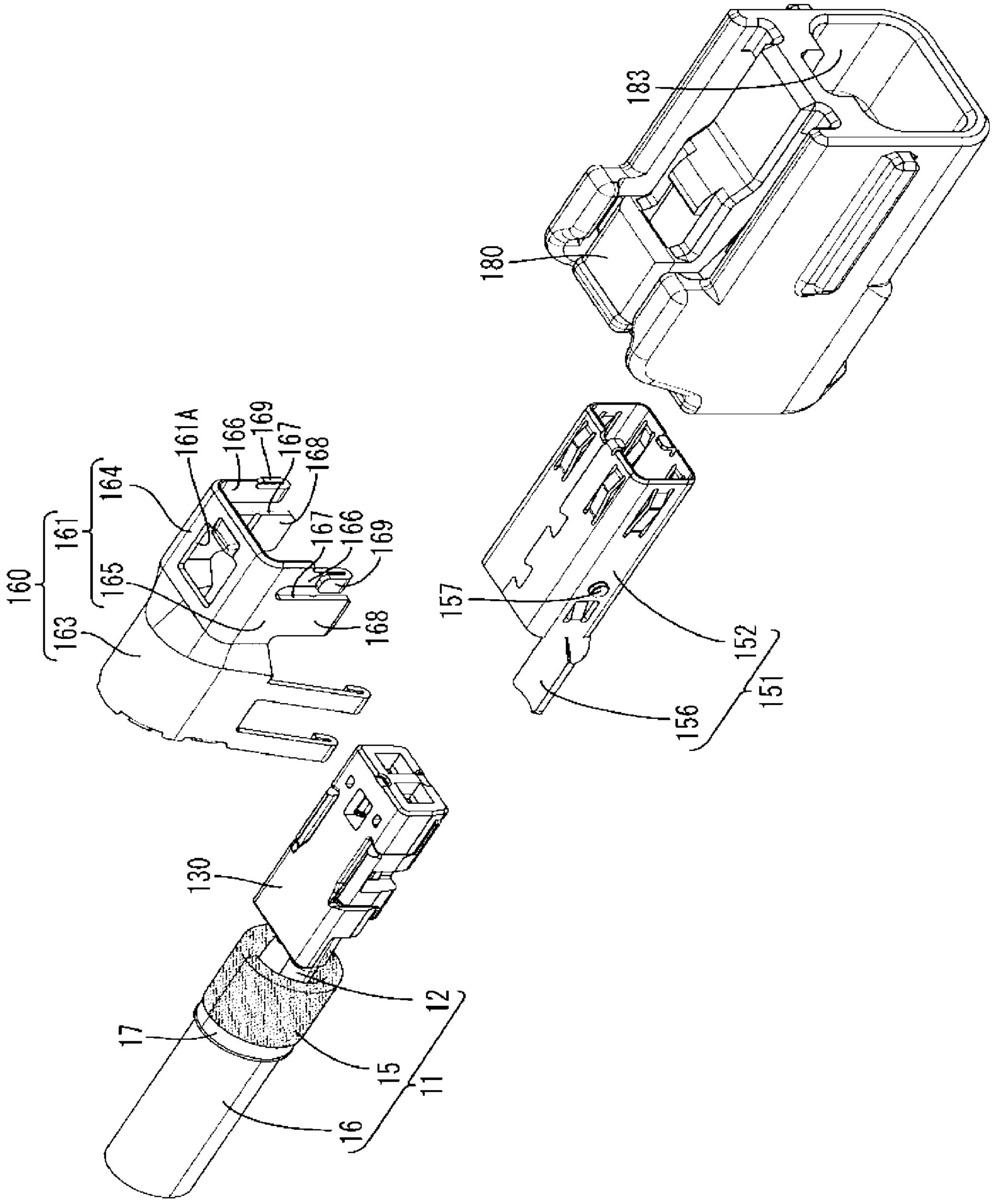
FIG. 2 is an exploded perspective view showing a female connector.

As shown in FIG. 2, the cable 11 includes two electric wires (example of an electric wire) 12, a shield body 15 constituted by a braided wire for collectively covering the outer peripheries of the electric wires 12, and a sheath 16 constituted by an insulating coating for further covering the outer periphery of the shield body 15. The braided wire is made by weaving a plurality of fibrous conductors. The conductors constituting the braided wire may be thin metallic wires, or may be formed by sticking metal on a surface of a synthetic resin fiber, and any conductor can be selected. The shield body 15 according to the present embodiment is woven with a plurality of thin metallic wires.

As shown in FIG. 2, at the front end of the cable 11, the sheath 16 is stripped, and the two electric wires 12 exposed from ends of the sheath 16 and the shield body 15 are exposed. At the rear of the exposed electric wires 12 in the cable 11, the shield body 15 exposed from the end of the sheath 16 is folded onto an end part of the sheath 16.

A sleeve 17 made of metal is arranged inside the shield body 15 folded onto the end part of the sheath 16. The sleeve 17 is formed into a hollow cylindrical shape.

[Female Connector 110]

As shown in FIGS. 1 and 2, the female connector 110 includes a plurality of female inner conductors 120 (an example of an inner conductor) connected to the two electric wires 12 exposed at the front end of the cable 11, a female dielectric body 130 that houses the plurality of female inner conductors 120, a female outer conductor 150 connected to the shield body 15 of the cable 11 while covering the female dielectric body 130, and a female housing 180 that houses the female outer conductor 150.

[Female Inner Conductor 120]

The female inner conductor 120 is formed by processing a conductive metal plate material. As shown in FIG. 1, the female inner conductor 120 includes a terminal connecting portion 122 in the form of a rectangular tube and an electric wire connecting portion 124 connected to a rear side of the terminal connecting portion 122.

The terminal connecting portion 122 is electrically connected to a male inner conductor 20 (an example of an inner conductor) of the male connector 10 to be described below. The electric wire connecting portion 124 is electrically connected to the electric wire 12 by being crimped to the front end of the electric wire 12.

[Female Dielectric Body 130]

As shown in FIG. 2, the female dielectric body 130 is formed of insulating synthetic resin into a rectangular parallelepiped shape long in a front-rear direction. Inside the female dielectric body 130, two female inner conductors 120 connected to the electric wires 12 are housed side by side in a lateral direction.

[Female Outer Conductor 150]

As shown in FIG. 2, the female outer conductor 150 includes a first female outer conductor 151 (an example of a first outer conductor) and a second female outer conductor 160 (an example of a second outer conductor) assembled with the first female outer conductor. The first female outer conductor 151 and the second female outer conductor 160 are formed by pressing a conductive metal plate material into a predetermined shape. The second female outer conductor 160 is assembled with the first female outer conductor 151 from above.

Figure 3:
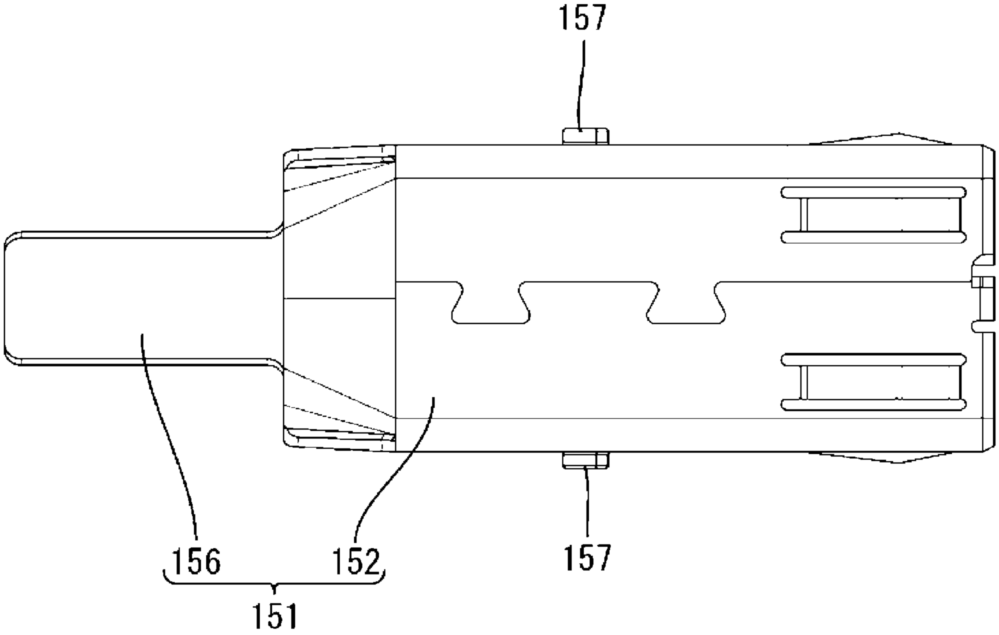
FIG. 3 is a plan view showing a first female outer conductor.

As shown in FIG. 3, the first female outer conductor 151 includes a tubular connecting portion 152 that can be fitted with the male outer conductor 50 of the male connector 10 to be described below and a female shield connecting portion 156 connected to the shield body 15 of the cable 11.

The tubular connecting portion 152 is formed into a rectangular tube shape long in the front-rear direction. The female dielectric body 130 can be housed into the tubular connecting portion 152 from behind. When the female dielectric body 130 is housed into the tubular connecting portion 152, the female inner conductor 120 is housed in a state of being electrically insulated from the tubular connecting portion 152 by the female dielectric body 130, as shown in FIG. 1.

As shown in FIG. 3, female positioning projections (examples of positioning projections) 157 projecting outward are formed on left and right side walls of the tubular connecting portion 152. The female positioning projections 157 has a substantially hollow cylindrical shape.

The female shield connecting portion 156 is formed in a plate shape extending rearward from a lower end part on a lower side of the tubular connecting portion 152. The female shield connecting portion 156 is arranged below the shield body 15 in the cable 11 as shown in FIG. 1.

[Second Female Outer Conductor 160]

The second female outer conductor 160 is formed by processing a conductive metal plate material by a press or the like. As shown in FIG. 2, the second female outer conductor 160 includes a covering portion 161 to be assembled with the outer periphery of the tubular connecting portion 152 and a female barrel 163 crimped to the outer periphery of the shield body 15.

Figure 4:
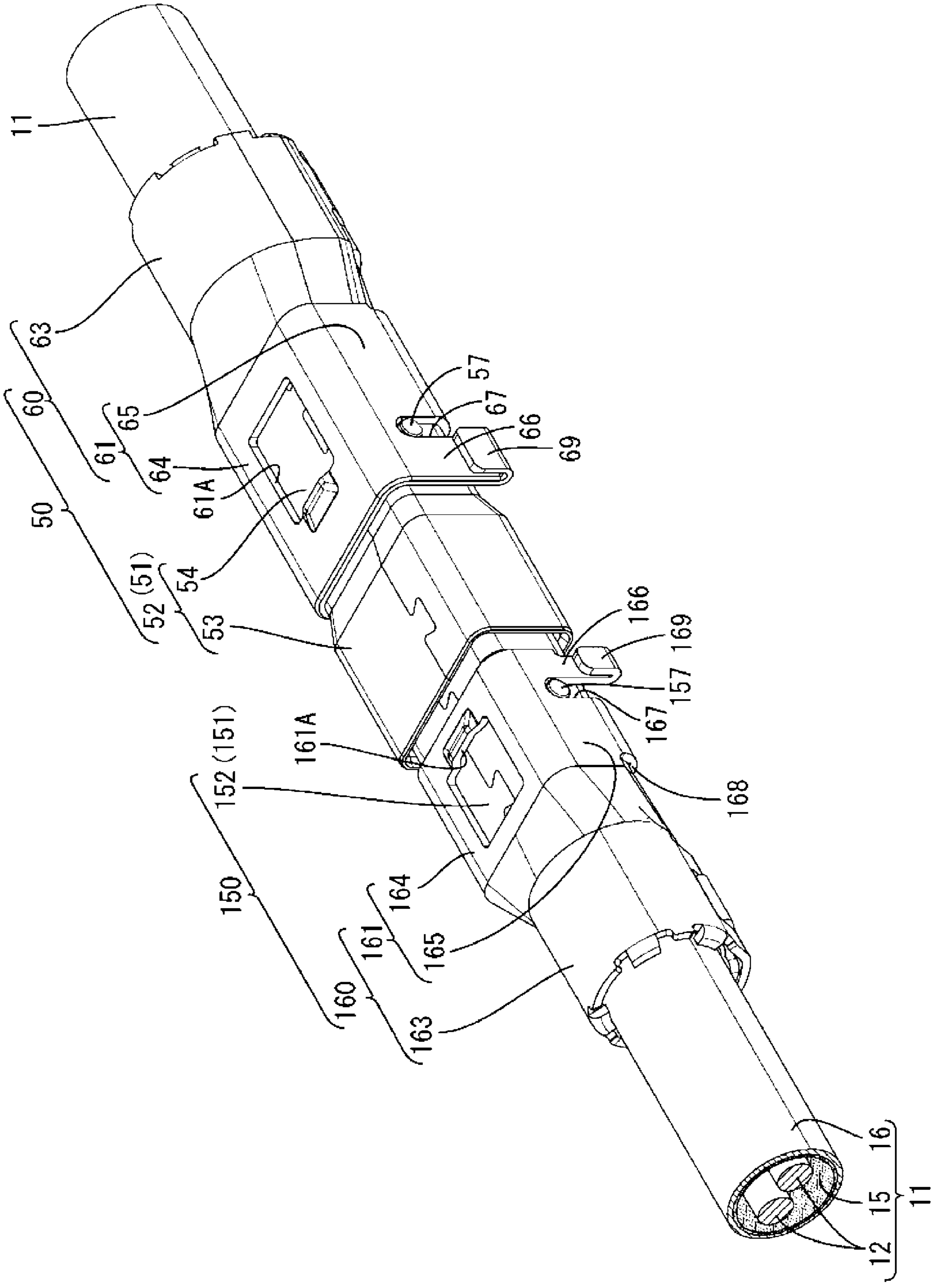
FIG. 4 is a perspective view in which a male housing and a female housing are not provided in a state where a male connector and a female connector are fitted.
Figure 5:
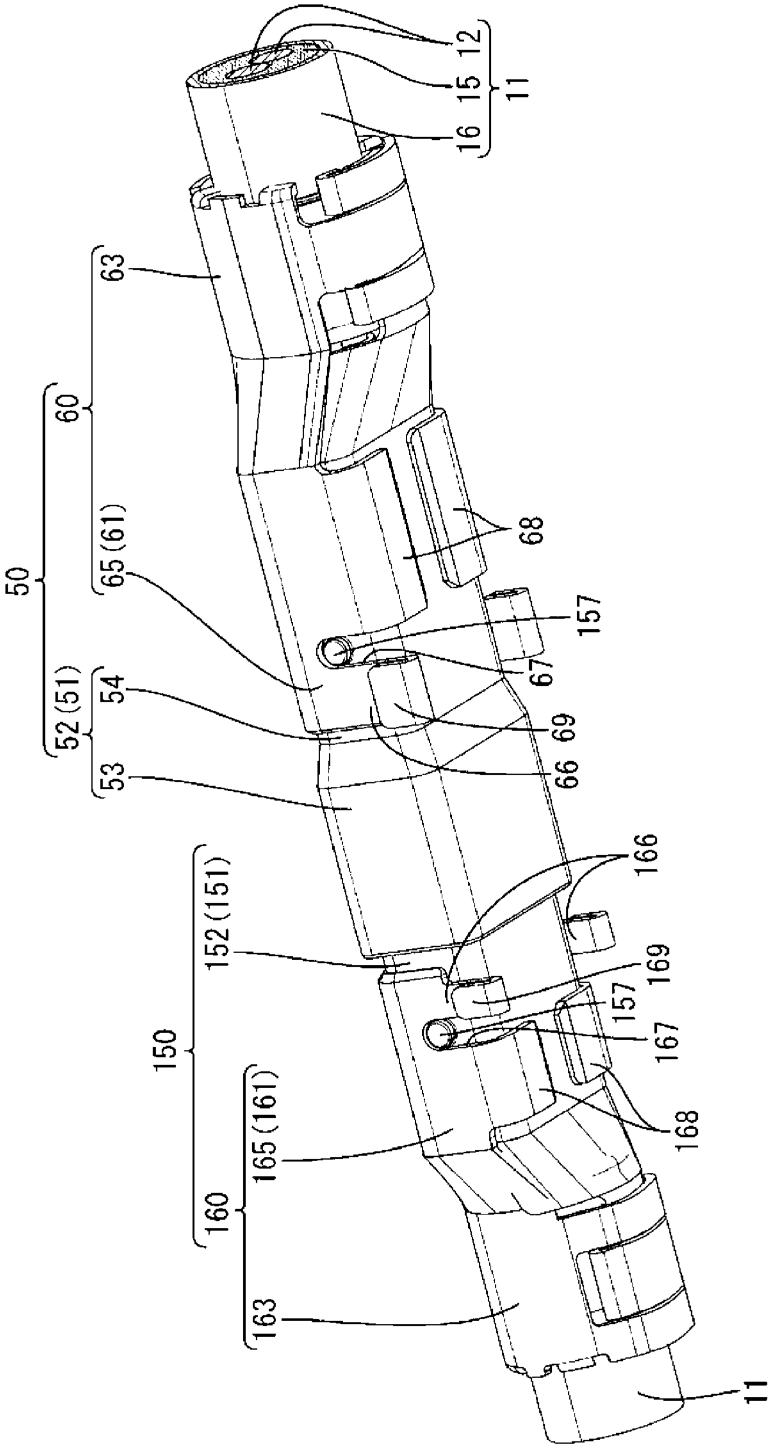
FIG. 5 is a perspective view seen from a different angle from FIG. 4, and is a perspective view in which a male housing and a female housing are not provided in a state where a male connector and a female connector are fitted.
Figure 6:
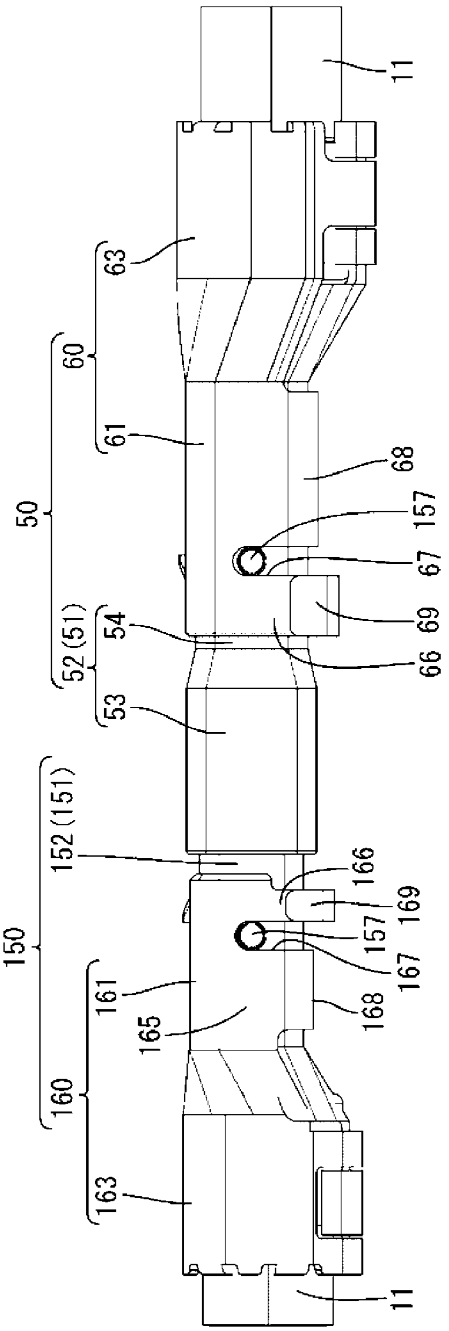
FIG. 6 is a side view showing the state where the male connector and the female connector are fitted.

As shown in FIGS. 4, 5, and 6, the covering portion 161 is wound around an outer peripheral surface of the tubular connecting portion 152. The covering portion 161 includes an upper wall 164 and side walls 165 extending downward from left and right side edges of the upper wall 164. On the side wall 165, a female stabilizer 166 (an example of a stabilizer), a female slit 167 (and example of a positioning recess), and a female crimping piece 168 (an example of a crimping piece) are formed in order from the front to the rear.

The female stabilizer 166 extending downward is formed at a position of the lower end part of the side wall 165 closer to the front end part. The female stabilizer 166 is formed in a shape of a plate extending long and thin downward. A lower end part of the female stabilizer 166 is regarded as a female folded portion (an example of a folded portion) 169, which is folded upward, to be overlapped to the outer surface of the female stabilizer 166.

Behind the female stabilizer 166, the female slit 167 is formed to extend upward from the lower end part of the side wall 165. A rear edge of the female stabilizer 166 constitutes a front opening edge of the female slit 167.

Behind the female slit 167, the female crimping piece 168 is formed to extend from the lower end part of the side wall 165. In the state before the second female outer conductor 160 is assembled with the first female outer conductor 151 as shown in FIG. 2, the female crimping piece 168 extends downward from the lower end part of the side wall.

As shown in FIG. 5, the female crimping piece 168 is crimped so as to wind around the lower part of the tubular connecting portion 152, and thus the second female outer conductor 160 and the first female outer conductor 151 are integrally assembled. A front edge of the female crimping piece 168 constitutes a rear opening edge of the female slit 167.

A width dimension of the female slit 167 in the front-rear direction is equal to or slightly larger than an outer diameter dimension of the female positioning projection 157. Thus, the female positioning projection 157 is housed in the female slit 167.

When the second female outer conductor 160 is assembled from an upper side of the first female outer conductor 151, the female positioning projection 157 is inserted into the female slit 167, whereby the second female outer conductor 160 and the first female outer conductor are aligned. Further, when the female crimping piece 168 is crimped to the tubular connecting portion 152, there is a case where both or one of the first female outer conductor and the second female outer conductor may extend in the front-rear direction. At this time, when the female positioning projection 157 comes into contact with the opening edge of the female slit 167 in the front-read direction, positional misalignment of the second female outer conductor 160 and the first female outer conductor 151 in the front-rear direction is prevented.

As shown in FIG. 1, the female barrel 163 is crimped to the outer periphery of the shield body 15 folded in the cable 11, and thus is electrically connected and fixed to the shield body 15. In other words, the female barrel 163 is crimped and fixed together with the female shield connecting portion 156 so as to be wound around the shield body 15 of the cable 11.

[Female Housing 180]

The female housing 180 is made of synthetic resin, and includes a housing portion 182, which houses the female outer conductor 150 from the rear, as shown in FIG. 1. The housing portion 182 is formed to penetrate in the front-rear direction. A lance 183 to be fitted into a lance hole 161A provided in the female outer conductor 150 is provided inside the housing portion 182.

The lance 183 is fitted into the lance hole 161A as shown in FIG. 1 when the female outer conductor 150 is housed at a regular housing position of the housing portion 182. Therefore, the lance 183 and an edge part of the lance hole 161A are locked, and thus the female outer conductor 150 is held in the female housing 180.

Figure 7:
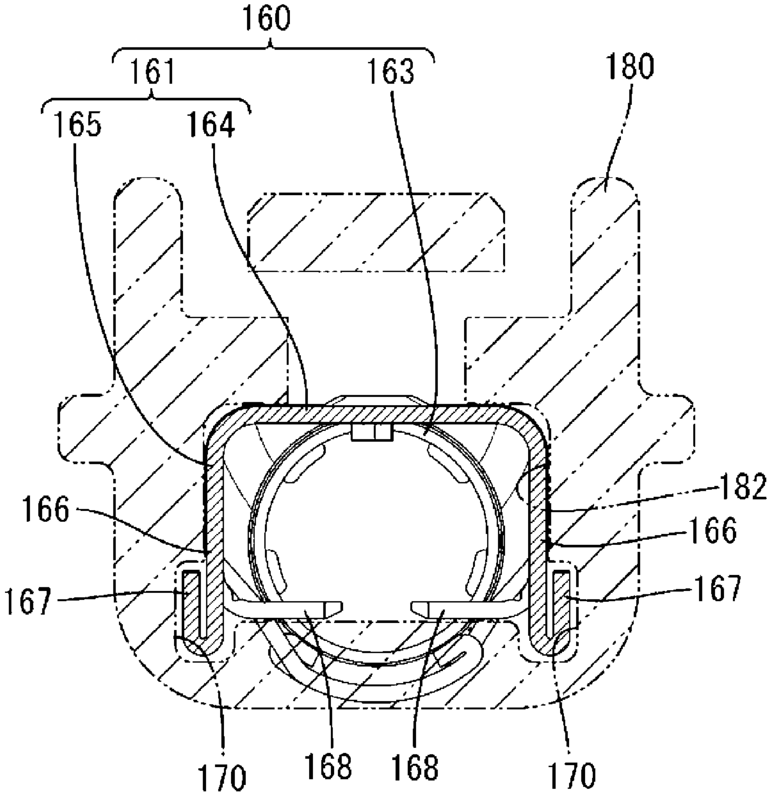
FIG. 7 is a section view showing a state a female guide groove is engaged with a female stabilizer, and a female folded portion.

As shown in FIG. 7, a female guide groove 170 (an example of a guide groove) is formed in the housing portion 182 at a position corresponding to the female folded portion 169 of the female stabilizer 166 so as to extend in the front-rear direction. An inner shape of the female guide groove 170 is formed to be larger than an outer shape of the female stabilizer 166 including the female folded portion 169. The female folded portion 169 comes into contact with the inner surface of the female guide groove 170, and thus relative positioning of the female housing 180 and the female outer conductor 150 is performed.

[Male Connector 10]

Figure 8:
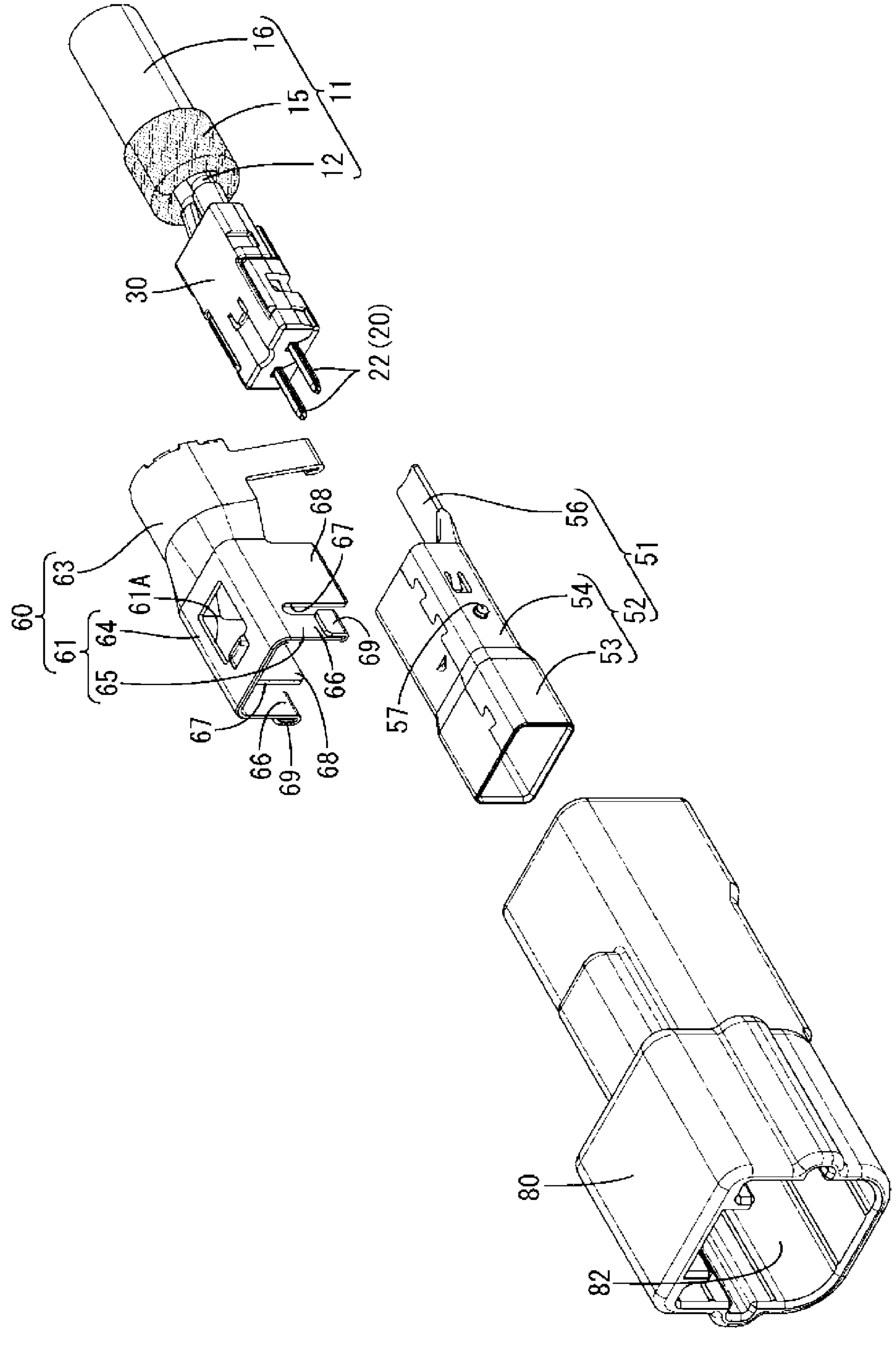
FIG. 8 is an exploded perspective view showing a male connector.

As shown in FIGS. 1 and 8, the male connector 10 includes a plurality of male inner conductors 20 connected to the two electric wires 12 exposed at the front end of the cable 11, a male dielectric body 30 that houses the plurality of male inner conductors 20, a male outer conductor 50 connected to the cable 11 while covering the male dielectric body 30, and a male housing 80 that houses the male outer conductor 50.

[Male Inner Conductor 20]

The male inner conductor 20 is formed by processing a conductive metal plate material. As shown in FIG. 1, the male inner conductor 20 includes a male connecting portion 22 in the form of a pin, a box portion 23 connected to a rear end part of the male connecting portion 22 having a rectangular parallelepiped shape long in the front-rear direction, and an electric wire connecting portion 24 connected to a rear side of the box portion 23.

As shown in FIG. 1, the male connecting portion 22 is electrically connected to the female inner conductor 120 by entering the inside of the terminal connecting portion 122 in the female inner conductor 120 of the female connector 110 from front. The electric wire connecting portion 24 is crimped to the front end of the electric wire 12 and is electrically connected to the electric wire 12.

[Male Dielectric Body 30]

As shown in FIG. 8, the male dielectric body 30 is formed of insulating synthetic resin into a rectangular parallelepiped shape long in the front-rear direction.

Inside the male dielectric body 30, two male inner conductors 20 connected to the electric wires 12 are housed side by side in the lateral direction. When the male inner conductor 20 is housed inside the male dielectric body 30, the male connecting portion 22 is in a state of projecting from a front wall of the male dielectric body 30.

[Male Outer Conductor 50]

As shown in FIG. 1, the male outer conductor 50 can be fitted with the female outer conductor 150 of the female connector 110. As shown in FIG. 8, the male outer conductor 50 is composed of a first male outer conductor 51 (an example of a first outer conductor) for housing the male dielectric body 30 inside and a second male outer conductor 60 (an example of a second outer conductor) assembled with the first male outer conductor 51 to cover the outer peripheries of the first male outer conductor 51 and the shield body 15 of the cable 11.

[First Male Outer Conductor 51]

Figure 9:
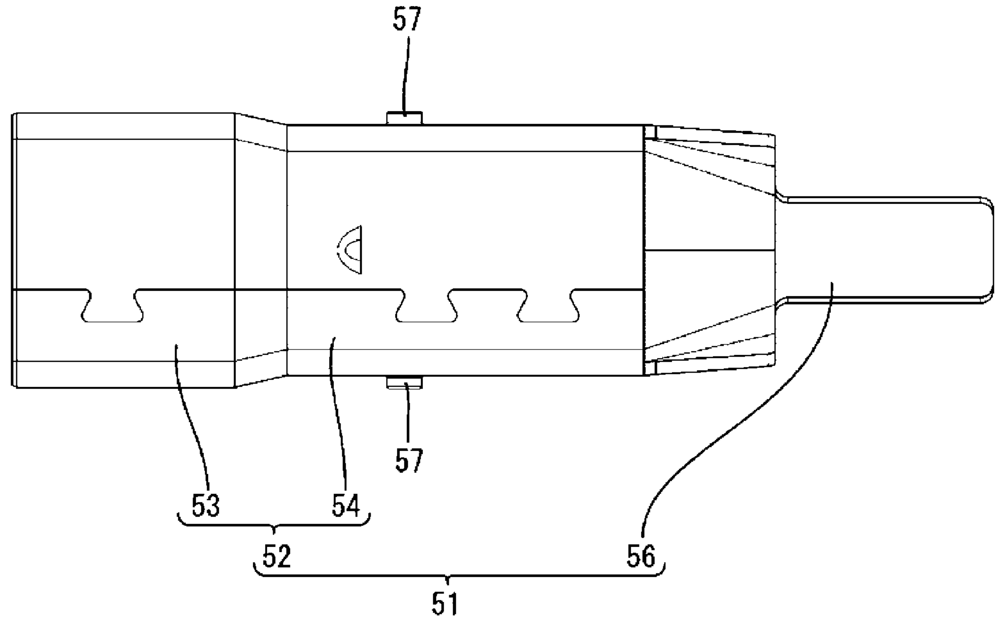
FIG. 9 is a plan view showing a first male outer conductor.

The first male outer conductor 51 is formed by processing a conductive metal plate material. As shown in FIGS. 8 and 9, the first male outer conductor 51 includes a connecting tube portion 52 in the form of a rectangular tube substantially rectangular in a front view and a male shield connecting portion 56 provided on the lower rear end edge of the connecting tube portion 52.

As shown in FIGS. 4, 5, and 6, the front part of the connecting tube portion 52 is a large-diameter tube portion 53 into which the tubular connecting portion 152 of the female outer conductor 150 of the female connector 110 is fitted into the inside. A rear side of the large-diameter tube portion 53 is arranged coaxially with the large-diameter tube portion 53, and is a small-diameter tube portion 54 having a small diameter that is one size smaller than the large-diameter tube portion 53.

As shown in FIGS. 4, 5, and 6, the small-diameter tube portion 54 is formed to have the same diameter as the tubular connecting portion 152 of the female outer conductor 150. Here, the expression "the small-diameter tube portion 54 and the tubular connecting portion 152 have the same diameter" means a case where the small-diameter tube portion 54 and the tubular connecting portion 152 have the same diameter and a case of being regarded as having substantially the same diameter even when the small-diameter tube portion 54 and the tubular connecting portion 152 do not have the same diameter. Therefore, the connecting tube portion 52 is narrower from a central part to a rear part as a whole as compared with a front part. Male positioning projections 57 (examples of positioning projections) are formed on left and right side walls of the small-diameter tube portion 54 to project outward. The male positioning projections 57 have a substantially hollow cylindrical shape.

Since the male positioning projections 57 are formed on the small-diameter tube portion 54, the male outer conductor 50 can be miniaturized as compared with a case where the male positioning projections 57 are formed on the large-diameter tube portion 53.

The male dielectric body 30 can be housed inside the connecting tube portion 52 from behind. When the male dielectric body 30 is housed inside the connecting tube portion 52 from behind, the rear part of the male inner conductor 20 from the box portion 23 is housed in a state of being electrically insulated from the small-diameter tube portion 54 by the male dielectric body 30, and the male connecting portion 22 is arranged in the large-diameter tube portion 53 in a state of projecting from the male dielectric body 30, as shown in FIG. 1.

The male shield connecting portion 56 is formed in a plate shape extending rearward from a lower end part on a lower side of the connecting tube portion 52. The male shield connecting portion 56 is arranged below the shield body 15 in the cable 11 as shown in FIG. 1.

[Second Male Outer Conductor 60]

The second male outer conductor 60 is formed by processing a conductive metal plate material by a press or the like. As shown in FIG. 8, the second male outer conductor 60 includes a covering portion 61 to be assembled with the outer periphery of the small-diameter tube portion 54 and a male barrel 63 crimped to the outer periphery of the shield body 15.

The covering portion 61 is wound around an outer peripheral surface of the small-diameter tube portion 54 so as to surround the outer peripheral surface of the small-diameter tube portion 54. When the covering portion 61 is assembled with the outer peripheral surface of the small-diameter tube portion 54, the covering portion 61 is formed to have the same diameter as the large-diameter tube portion 53 as shown in FIGS. 4, 5, and 6. Here, the expression "the covering portion 61 and the large-diameter tube portion 53 have the same diameter means a case where the covering portion 61 and the large-diameter tube portion 53 have the same diameter and a case of being regarded as having substantially the same diameter even when the covering portion 61 and the large-diameter tube portion 53 do not have the same diameter. A through hole 61A, into which a terminal locking portion 83 of a male housing 80 to be described below is fitted, is formed at an upper part of the covering portion 61 so as to penetrate the covering portion 61 in the vertical direction.

As shown in FIGS. 4, 5, and 6, the covering portion 61 includes an upper wall 64 and side walls 65 extending downward from left and right side edges of the upper wall 64. On the side wall 65, a male stabilizer 66 (an example of a stabilizer), a male slit 67 (and example of a positioning recess), and a male crimping piece 68 (an example of a crimping piece) are formed in order from the front to the rear.

The male stabilizer 66 extending downward is formed at a position of the lower end part of the side wall 65 closer to the front end part. The male stabilizer 66 is formed in a shape of a plate extending long and thin downward. A lower end part of the male stabilizer 66 is regarded as a male folded portion (an example of a folded portion) 69, which is folded upward, to be overlapped to the outer surface of the male stabilizer 66.

Behind the male stabilizer 66, the male slit 67 is formed to extend upward from the lower end part of the side wall 65. A rear edge of the male stabilizer 66 constitutes a front opening edge of the male slit 67.

Behind the male slit 67, the male crimping piece 68 is formed to extend from the lower end part of the side wall 65. In the state before the second male outer conductor 60 is assembled with the first male outer conductor 51 as shown in FIG. 8, the male crimping piece 68 extends downward from the lower end part of the side wall.

As shown in FIG. 5, the male crimping piece 68 is crimped so as to wind around the lower part of the small-diameter tube portion 54, and thus the second male outer conductor 60 and the first male outer conductor 51 are integrally assembled. A front edge of the male crimping piece 68 constitutes a rear opening edge of the male slit 67.

A width dimension of the male slit 67 in the front-rear direction is equal to or slightly larger than an outer diameter dimension of the male positioning projection 57. Thus, the male positioning projection 57 is housed in the male slit 67.

When the second male outer conductor 60 is assembled from an upper side of the first male outer conductor 51, the male positioning projection 57 is inserted into the male slit 67, whereby the second male outer conductor 60 and the first male outer conductor are aligned. Further, when the male crimping piece 68 is crimped to the small-diameter tube portion 54, there is a case where both or one of the first male outer conductor and the second male outer conductor may extend in the front-rear direction. At this time, when the male positioning projection 57 comes into contact with the opening edge of the male slit 67 in the front-read direction, positional misalignment of the second male outer conductor 60 and the first male outer conductor 51 in the front-rear direction is prevented.

As shown in FIG. 1, the male barrel 63 is crimped to the outer periphery of the shield body 15 folded in the cable 11, and thus is electrically connected and fixed to the shield body 15. In other words, the male barrel 63 is connected to the shield body 15 of the cable 11 together with the male shield connecting portion 56.

[Male Housing 80]

The male housing 80 is made of synthetic resin, and includes a housing portion 82 which houses the male outer conductor 50 from the rear. As shown in FIG. 1, the housing portion 82 is formed to penetrate in the front-rear direction. The terminal locking portion 83 to be fitted into the through hole 61A provided in the covering portion 61 is provided inside the housing portion 82.

The terminal locking portion 83 is fitted into the through hole 61A as shown in FIG. 1 when the male outer conductor 50 is housed at a regular housing position of the housing portion 82. Therefore, the terminal locking portion 83 and an edge part of the through hole 61A are locked, and thus the male outer conductor 50 is held in the male housing 80.

Figure 10:
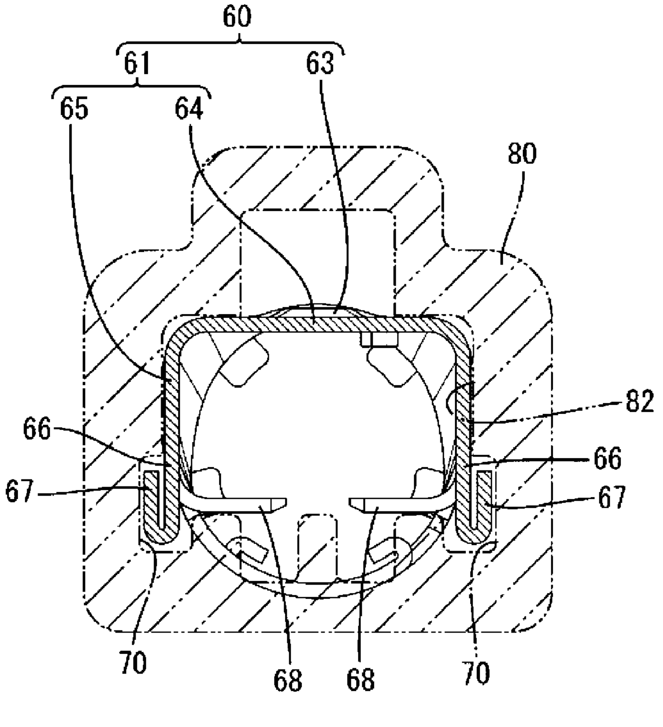
FIG. 10 is a section view showing a state where a male guide groove is engaged with a male stabilizer, and a male folded portion.

As shown in FIG. 10, a male guide groove 70 (an example of a guide groove) is formed in the housing portion 82 at a position corresponding to the male folded portion 69 of the male stabilizer 66 so as to extend in the front-rear direction. An inner shape of the male guide groove 70 is formed to be larger than an outer shape of the male stabilizer 66 including the male folded portion 69. The male folded portion 69 comes into contact with the inner surface of the male guide groove 70, and thus relative positioning of the male housing 80 and the male outer conductor 50 is performed.

Operational Effects of Present Embodiment

Subsequently, operational effects of the present embodiment will be described. The technique disclosed herein is applied to the male connector 10 and the female connector 110 constituting the connector device 1.

The present embodiment provides the male connector 10 connected to an end of a cable 11 in which the outer periphery of an electric wire 12 has been covered with a shield body 15, the male connector 10 including: a first male outer conductor 51; and a second male outer conductor 60 assembled to the first male outer conductor 51. The first male outer conductor 51 and the second male outer conductor 60 cover a male dielectric body 30, in which a male inner conductor 20 connected to the electric wire 12 is housed, in a state where the first male outer conductor 51 and the second male outer conductor 60 are assembled. One of the first male outer conductor 51 and the second male outer conductor 60 has a male positioning projection 57 which is formed so as to project toward the other one of the first male outer conductor 51 and the second male outer conductor 60, and the other one of the first male outer conductor 51 and the second male outer conductor 60 has a male slit 67 which is formed so as to engage with the male positioning projection 57.

The present embodiment provides the female connector 110 connected to an end of a cable 11 in which the outer periphery of an electric wire 12 has been covered with a shield body 15, the female connector 110 including: a first female outer conductor 151; and a second female outer conductor 160 assembled to the first female outer conductor 151. The first female outer conductor 151 and the second female outer conductor 160 cover a female dielectric body, in which a female inner conductor connected to the electric wire 12 is housed, in a state where the first female outer conductor 151 and the second female outer conductor 160 are assembled. One of the first female outer conductor 151 and the second female outer conductor 160 has a female positioning projection 157 which is formed so as to project toward the other one of the first female outer conductor 151 and the second female outer conductor 160, and the other one of the first female outer conductor 151 and the second female outer conductor 160 has a female slit 167 which is formed so as to engage with the female positioning projection 157.

According to the above configuration, the male positioning projection 57 and the male slit 67 are engaged with each other, and thus the efficiency of assembly work of the first male outer conductor 51 and the second male outer conductor 60 can be improved. This makes it possible to improve the efficiency of assembly work of the male connector 10. Similarly, the female positioning projection 157 and the female slit 167 are engaged with each other, and thus the efficiency of assembly work of the first female outer conductor 151 and the second female outer conductor 160 can be improved. This makes it possible to improve the efficiency of assembly work of the female connector 110.

In the male connector 10 according to the present embodiment, the second male outer conductor 60 is assembled to the outside of the first male outer conductor 51, the male positioning projection 57 is formed on the first male outer conductor 51 so as to project outward, and the second male outer conductor 60 is formed with a male slit 67 extending in an assembly direction in which the first male outer conductor 51 and the second male outer conductor 60 are assembled.

In the female connector 110 according to the present embodiment, the second female outer conductor 160 is assembled to the outside of the first female outer conductor 151, the female positioning projection 157 is formed on the first female outer conductor 151 so as to project outward, and the second outer conductor is formed with a female slit 167 extending in an assembly direction in which the first female outer conductor 151 and the second female outer conductor 160 are assembled.

According to the above configuration, in the assembly work of the first male outer conductor 51 and the second male outer conductor 60, the worker uses the male positioning projection 57 formed to project outward as a mark, and can assemble the second male outer conductor 60 with the first male outer conductor 51. Thus, the efficiency of assembly work of the first male outer conductor 51 and the second male outer conductor 60 can be improved, so that the efficiency of assembly work of the male connector 10 can be further improved. Similarly, in the assembly work of the first female outer conductor 151 and the second female outer conductor 160, the worker uses the female positioning projection 157 formed to project outward as a mark, and can assemble the second female outer conductor 160 with the first female outer conductor 151. Thus, the efficiency of assembly work of the first female outer conductor 151 and the second female outer conductor 160 can be improved, so that the efficiency of assembly work of the female connector 110 can be further improved.

In the male connector 10 according to the present embodiment, the second male outer conductor 60 includes a male crimping piece 68 that is crimped to an outer periphery of the first male outer conductor 51, and a side edge of the male crimping piece 68 forms an opening edge of the male slit 67.

In the female connector 110 according to the present embodiment, the second female outer conductor 160 includes a female crimping piece 168 that is crimped to an outer periphery of the first female outer conductor 151, and a side edge of the female crimping piece 168 forms an opening edge of the female slit 167.

According to the above configuration, since the positioning of the male crimping piece 68 can be reliably performed, assembly accuracy of the first male outer conductor 51 and the second male outer conductor 60 can be improved. Similarly, since the positioning of the female crimping piece 168 can be reliably performed, assembly accuracy of the first female outer conductor 151 and the second female outer conductor 160 can be improved.

In the male connector 10 according to the present embodiment, the first male outer conductor 51 and the second male outer conductor 60 are housed in the male housing 80 in the assembled state, the second male outer conductor 60 includes a male stabilizer 66 that engages with the male housing 80, and a side edge of the male stabilizer 66 forms an opening edge of the male slit 67.

In the female connector 110 according to the present embodiment, the first female outer conductor 151 and the second female outer conductor 160 are housed in the female housing 180 in the assembled state, the second female outer conductor 160 includes a female stabilizer 166 that engages with the female housing 180, and a side edge of the female stabilizer 166 forms an opening edge of the female slit 167.

According to the above configuration, since the positioning of the male stabilizer 66 can be reliably performed, assembly accuracy of the male housing 80 with the first male outer conductor 51 and the second male outer conductor 60 can be improved. Similarly, since the positioning of the female stabilizer 166 can be reliably performed, assembly accuracy of the female housing 180 with the first female outer conductor 151 and the second female outer conductor 160 can be improved.

In the male connector 10 according to the present embodiment, the male stabilizer 66 includes a male folded portion 69 in which a tip end part of the male stabilizer 66 is folded, and the male folded portion 69 is inserted into a male guide groove 70 formed in the male housing 80.

In the female connector 110 according to the present embodiment, the female stabilizer 166 includes a female folded portion 169 in which a tip end part of the female stabilizer 166 is folded, and the female folded portion 169 is inserted into a female guide groove 170 formed in the female housing 180.

Since the engagement allowance between the male stabilizer 66 and the male housing 80 can be increased, assembly accuracy of the male housing 80 with the first male outer conductor 51 and the second male outer conductor 60 can be further improved. Similarly, since the engagement allowance between the female stabilizer 166 and the female housing 180 can be increased, assembly accuracy of the female housing 180 with the first female outer conductor 151 and the second female outer conductor 160 can be further improved.

Other Embodiments (1) In the above embodiment, the male connector 10 is connected to the cable 11 having two electric wires 12. However, the present invention is not limited thereto, and may a configuration in which the cable 11 includes one electric wire 12 or three or more electric wires 12.

LIST OF REFERENCE NUMERALS

1: connector device
10: male connector
11: cable
12: electric wire
15: shield body
16: sheath
17: sleeve
20: male inner conductor
22: male connecting portion
23: box portion
24: electric wire connecting portion
30: male dielectric body
50: male outer conductor
51: first male outer conductor
52: connecting tube portion
53: large-diameter tube portion
54: small-diameter tube portion
56: male shield connecting portion
57: male positioning projection
60: second male outer conductor
61: covering portion
61A: through hole
63: male barrel
64: upper wall
65: side wall
66: male stabilizer
67: male slit
68: male crimping piece
69: male folded portion
70: male guide groove
80: male housing
82: housing portion
83: terminal locking portion
110: female connector
120: female inner conductor
122: terminal connecting portion
124: electric wire connecting portion

130: female dielectric body
150: male outer conductor
151: first female outer conductor
152: tubular connecting portion
156: female shield connecting portion
157: female positioning projection
160: second female outer conductor
161: covering portion
161A: lance hole
163: female barrel
164: upper wall
165: side wall
166: female stabilizer
167: female slit
168: female crimping piece
169: female folded portion
170: female guide groove
180: female housing
182: housing portion
183: lance

What is claimed is:

1. A connector comprising:

a first outer conductor; and a second outer conductor assembled to outside of the first outer conductor, wherein the first outer conductor and the second outer conductor cover a dielectric body, in which an inner conductor connected to an electric wire of a cable is housed, in a state where the first outer conductor and the second outer conductor are assembled, the cable having an end portion to be connected to the connector and including a shield body covering an outer periphery of the electric wire, a positioning projection is formed on the first outer conductor so as to project outward toward the second outer conductor, and the second outer conductor has a positioning recess which is a slit extending in an assembly direction in which the first outer conductor and the second outer conductor are assembled so as to engage with the positioning projection, the second outer conductor includes a crimping piece that is crimped to an outer periphery of the first outer conductor, and a side edge of the crimping piece forms an opening edge of the slit.

2. The connector according to claim 1, wherein the first outer conductor and the second outer conductor are housed in a housing in the assembled state, the second outer conductor includes a stabilizer that engages with the housing, and a side edge of the stabilizer forms an opening edge of the slit.

3. The connector according to claim 2, wherein the stabilizer includes a folded portion in which a tip end part of the stabilizer is folded, and the folded portion is inserted into a guide groove formed in the housing.

* * * * *